US010725610B2

(12) United States Patent
Bastide et al.

(10) Patent No.: US 10,725,610 B2
(45) Date of Patent: *Jul. 28, 2020

(54) CUSTOMIZING A TAG CLOUD

(71) Applicant: International Business Machines Corporation, Armonk, NY (US)

(72) Inventors: Paul R. Bastide, Boxford, MA (US); Matthew E. Broomhall, South Burlington, VT (US); Robert E. Loredo, North Miami Beach, FL (US); Matthew S. Rosno, Waltham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/860,232

(22) Filed: Apr. 10, 2013

(65) Prior Publication Data

US 2013/0227484 A1   Aug. 29, 2013

Related U.S. Application Data

(63) Continuation of application No. 13/344,216, filed on Jan. 5, 2012.

(51) Int. Cl.
*G06F 3/0481* (2013.01)
*G06F 16/951* (2019.01)
(Continued)

(52) U.S. Cl.
CPC ........ *G06F 3/04817* (2013.01); *G06F 3/0481* (2013.01); *G06F 3/04842* (2013.01);
(Continued)

(58) Field of Classification Search
CPC ........ G06F 17/30044; G06F 17/30058; G06F 17/30064; G06F 17/30268;
(Continued)

(56) References Cited

U.S. PATENT DOCUMENTS 7,752,534 B2   7/2010   Blanchard, III et al.
7,779,342 B2   8/2010   Dey
(Continued)

FOREIGN PATENT DOCUMENTS

CN   101563691   10/2009
CN   101641696    2/2010
(Continued)

OTHER PUBLICATIONS

Zheng et al; A recommender system based on tag and time information for social tagging systems; Expert Systems with Applications: An International Journal vol. 38 Issue 4, Apr. 2011; Pergamon Press, Inc. Tarrytown, NY, USA.

*Primary Examiner* — Matthew Ell
*Assistant Examiner* — Linda Huynh
(74) *Attorney, Agent, or Firm* — Fabian VanCott; Steven L. Nichols

(57) ABSTRACT

A method for customizing a tag cloud includes assigning a score to each tag in a source of tags, the score being based on a tag attribute; temporarily increasing the score for a new tag during a time period measured from a creation of the new tag; and customizing said tag cloud in a graphical user interface by emphasizing each tag according to its score.

15 Claims, 5 Drawing Sheets

(51) Int. Cl.
  *G06F 16/31* (2019.01)
  *G06F 16/9535* (2019.01)
  *G06F 3/0484* (2013.01)
  *G06F 16/9538* (2019.01)

(52) U.S. Cl.
  CPC ........ *G06F 16/313* (2019.01); *G06F 16/9535* (2019.01); *G06F 16/9538* (2019.01)

(58) Field of Classification Search
  CPC .......... G06F 17/3053–30554; G06F 17/3061–30728; G06F 17/30817–3087; G06F 17/3089; G06F 17/30899–30905; G06F 17/30941; G06F 17/30994; G06F 3/048–04886; G06F 17/30598–30601; G06F 17/30696–30728; G06F 17/30964–30997
  USPC .......... 705/1.1–500; 707/600–899; 715/200–867
  See application file for complete search history.

(56) References Cited

U.S. PATENT DOCUMENTS

| | | | |
|---|---|---|---|
| 2006/0085431 A1 | 4/2006 | Burns | |
| 2006/0136405 A1* | 6/2006 | Ducatel et al. | 707/4 |
| 2006/0218141 A1* | 9/2006 | Tuttle | G06F 17/30696 |
| 2007/0043761 A1 | 2/2007 | Chim | |
| 2008/0016098 A1* | 1/2008 | Frieden | G06F 16/951 |
| 2008/0071929 A1* | 3/2008 | Motte | H04L 67/20 |
| | | | 709/246 |
| 2008/0072145 A1* | 3/2008 | Blanchard | G06F 40/12 |
| | | | 715/273 |
| 2008/0091633 A1 | 4/2008 | Rappaport | |
| 2008/0097767 A1* | 4/2008 | Milman | G06Q 30/02 |
| | | | 705/1.1 |
| 2008/0282186 A1* | 11/2008 | Basavaraju | 715/781 |
| 2009/0077025 A1* | 3/2009 | Brooks | G06F 16/9535 |
| 2009/0077124 A1* | 3/2009 | Spivack | G06Q 30/02 |
| 2009/0157709 A1 | 6/2009 | Kruger et al. | |
| 2009/0158146 A1* | 6/2009 | Curtis | G06F 16/907 |
| | | | 715/700 |
| 2009/0182727 A1* | 7/2009 | Majko | G06F 16/248 |
| 2010/0036856 A1* | 2/2010 | Portilla | H04L 51/34 |
| 2010/0070860 A1* | 3/2010 | Alkov | G06F 16/70 |
| | | | 715/716 |
| 2010/0083131 A1* | 4/2010 | You | G06F 17/30861 |
| | | | 715/745 |
| 2010/0095269 A1* | 4/2010 | Bouillet | G06F 8/10 |
| | | | 717/104 |
| 2010/0161620 A1* | 6/2010 | Lamere | G06F 16/68 |
| | | | 707/749 |
| 2010/0229082 A1 | 9/2010 | Karmarkar et al. | |
| 2010/0332513 A1* | 12/2010 | Azar et al. | 707/769 |
| 2011/0131207 A1* | 6/2011 | Jonsson | G06Q 10/107 |
| | | | 707/730 |
| 2011/0225547 A1* | 9/2011 | Fong | G06F 3/04817 |
| | | | 715/835 |
| 2012/0197871 A1* | 8/2012 | Mandel | G06Q 10/107 |
| | | | 707/722 |
| 2012/0254776 A1* | 10/2012 | Corella | G06F 3/0481 |
| | | | 715/760 |
| 2013/0066673 A1 | 3/2013 | Rose | |
| 2015/0317714 A1* | 11/2015 | Huet | G06F 16/951 |
| | | | 705/26.62 |

FOREIGN PATENT DOCUMENTS

| | | |
|---|---|---|
| CN | 101751448 A | 6/2010 |
| CN | 101790729 | 7/2010 |
| EP | 2136301 A1 | 12/2009 |
| EP | 2226719 A1 | 9/2010 |

* cited by examiner

CUSTOMIZING A TAG CLOUD

RELATED APPLICATION

The present specification is a continuation, and claims the priority under 35 U.S.C. § 120, of previous U.S. patent application Ser. No. 13/344,216, entitled "Customizing a Tag Cloud," filed Jan. 5, 2012, which application is incorporated herein by reference in its entirety.

BACKGROUND

The present invention relates to tag clouds, and more specifically, to tag clouds that identify tags contextually relevant to users.

Tag clouds are visual depictions that allow users to easily see the content of a tag source, such as a website. Usually, tags represent keywords within the source. The tag cloud emphasizes the tags that are more popular or are associated with more frequently used keywords within the source by increasing the tag's font size. The tags in the tag cloud are generally hyperlinked to keywords within the source for the user's convenience.

Tag clouds are generally shown in real time, and new tags created by the addition of keywords or other relevant metadata are added to the tag cloud. Generally, the tag cloud emphasizes old tags over new tags because new tags have had less time to build up their keyword frequency or popularity. However, new tags may be more interesting to frequent users because a frequent user may have already viewed the information associated with the older tags.

BRIEF SUMMARY

A method for customizing a tag cloud includes providing a graphical user interface to display a tag cloud; identifying a source of tags; assigning a score to each tag in the source based on a tag attribute; temporarily increasing the score for a new tag during a time period measured from a creation of the new tag; and customizing the tag cloud in the graphical user interface by emphasizing each tag according to its score.

A system for customizing a tag cloud includes at least one processor to access and execute computer readable instructions stored on a computer readable storage medium. The computer readable instructions cause the at least one processor to, upon execution of the computer readable instructions: identify tags from a source; assign a score to each tag in the source based on a tag attribute; temporarily increase the score for a new tag during a time period measured from a creation of the new tag; and create a tag cloud in a graphical user interface that emphasizes each tag according to its score.

A computer program product includes a computer readable storage medium with computer readable program code embodied therewith. The computer readable program code includes computer readable program code that identifies tags from a source; computer readable program code to assign a score to each tag in the source based on a tag attribute; computer readable program code that temporarily increases the score for a new tag during a time period measured from a creation of the new tag; and computer readable program code that creates a tag cloud in a graphical user interface that emphasizes each tag according to its score.

A computer implemented process for customizing a tag cloud includes identifying a source of tags; assigning a score to each tag in the source based on characteristics of the tags; identifying a new tag within the source; temporarily increasing the score for the new tag; and customizing a display of the tag cloud in a graphical user interface by emphasizing each tag according to its score.

DETAILED DESCRIPTION

Figure 1:
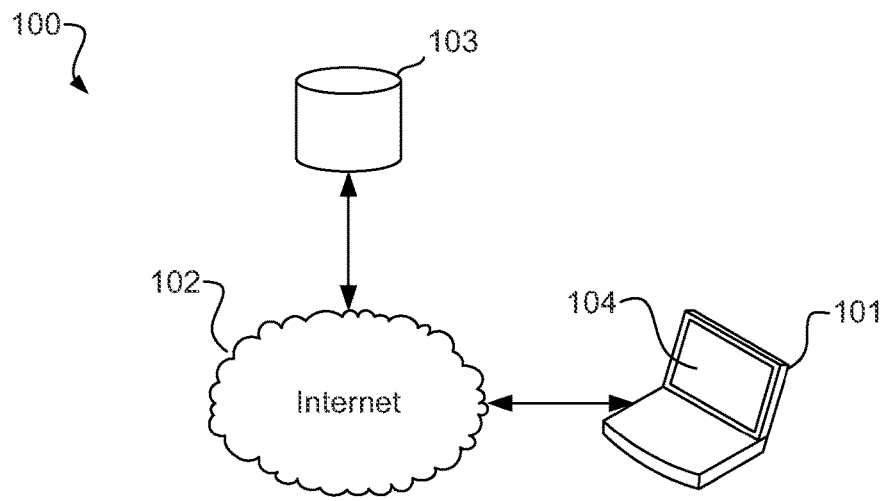
FIG. 1 is a diagram showing an illustrative system for customizing a tag cloud, according to one example of the principles described herein.

The present specification describes a method and system for customizing a tag cloud such that the tag cloud relays relevant information to users.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the figures, FIG. 1 is a diagram showing an illustrative system (100) for customizing a tag cloud.

According to certain illustrative examples, a user may access a webpage through a user interface (101) connected to the internet (102) or other network. The user interface (101) may comprise a graphical user interface (104) that displays the webpage. In some examples, a user interface (101) is a computer, a mobile device, laptop, watch, phone, or combinations thereof. The files and metadata for the webpage may be contained in a physical memory storage medium (103) connected to the internet (102) or other network. In some examples, the physical memory storage medium (103) is local to the user interface (101). The files and metadata may provide a source of tags that may assist the user when viewing the webpage to find information that is relevant to the user. Other tag sources may include online resources, blogs, reviews, applications, and combinations thereof.

Figure 2:
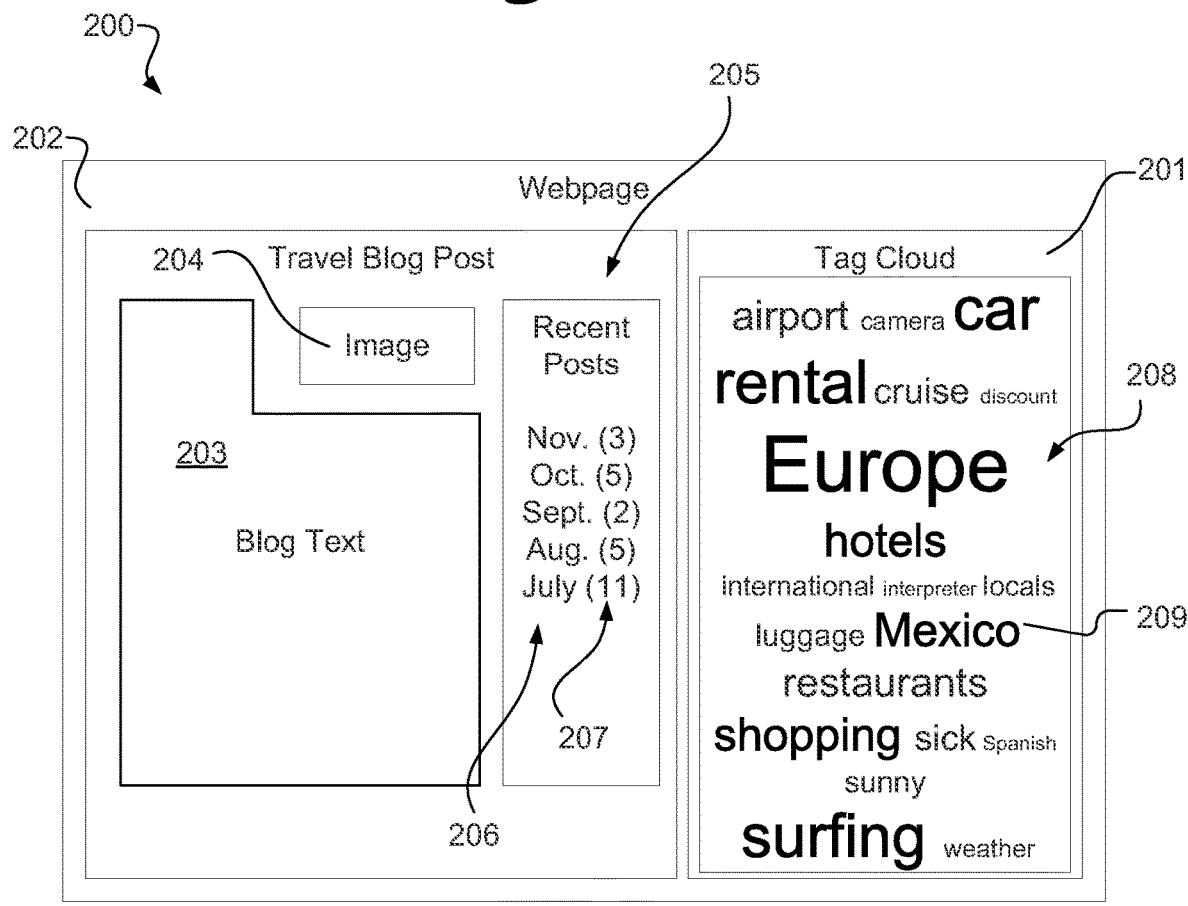
FIG. 2 is a diagram showing an illustrative display that includes a tag cloud, according to one example of the principles described herein.

FIG. 2 is a diagram showing a display (200) of the webpage that includes a tag cloud (201). In this illustrative example, the webpage is a travel blog that includes a plurality of posts about various topics. The webpage contains a post (202), which contains text (203) and an image (204) about a post topic. The display (200) also contains links (205) to recent posts categorized by category headings (206). In this illustrative example, the category headings (206) refer to the month each post was created. The category headings (206) are followed by a number (207) that indicates the number of posts within each category.

The post (202) contains metadata that may be associated with the text (203) and the image (204). The other posts may also contain metadata about their text and images. The metadata may include keywords contained in the text (202), hidden data about a particular post, and information about the image (204). Some of the metadata may be associated with each post's topic.

In the example of FIG. 2, the tag cloud (201) is positioned next to the post (202) and links (205). The tag cloud (201) contains a plurality of tags (208), which are tied to the metadata associated with each post's topic. The tags (208) are listed in alphabetical order. Each tag is visually differentiated from the others to convey comparative information to the user about each tag. In some examples, tags are visually differentiated with dimensions or emphasis from the following non-exhaustive list: different font sizes, font weights, font colors, color darkness, background colors, or combinations thereof. In some examples, the tags are visually differentiated by their location within the tag cloud (201).

The comparative information is often based on tag attributes, such as tag popularity or tag frequency. In some examples, tag popularity relates to how popular the subject of the tag appears. For example, a blog topic may be deemed more popular because a certain topic may be viewed more often than other topics or a certain tag is clicked on more often than other tags. Also, a tag attribute of frequency may be measured based on the number of times a keyword associated with the tag appears throughout the blog. In some examples, the tag attributes may be automatically added by the system, manually by a user, or combinations thereof.

Often, a tag (208) is assigned a score based on a single tag attribute or a plurality of tag attributes. In some examples, the tags are visually differentiated by a single dimension of emphasis. For example, the tags may be assigned a font size proportional to a particular tag attribute, like popularity or frequency. In other examples, the tags may be assigned a font size proportional to their frequency, and the tags may be listed in an order determined by the tags' popularity.

Many of the tag attributes may take time to build up. For example, both popularity and frequency attributes favor older tags. However, new tags may also be interesting to users as well. For example, a frequent user of a blog may be well versed in the blog's older content, and the frequent user may be interested in new topics discussed since the user's last visit to the blog. A tag cloud generator may temporarily assign a higher score for tags recently created so that the older tags do not divert the user's attention from the new tags.

In some examples, a score for a new tag may increase so much that the new tag is emphasized as much as an older tag with higher popularity or frequency attributes. For example, in FIG. 2, the tag, "Mexico" (209) may be a new tag that lacks a high popularity or frequency attribute, but the tag cloud may emphasis "Mexico" (209) to draw a user's attention to the new tag. The user may adjust settings so that new tags are or are not emphasized, depending on the user's preferences.

Figure 3:
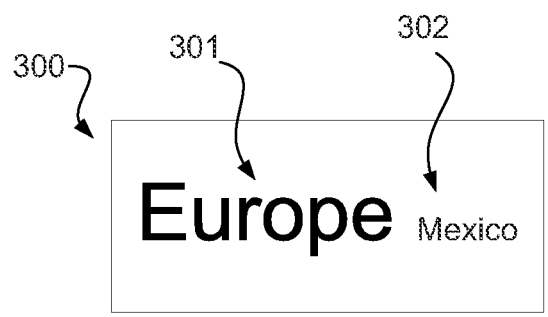
FIG. 3 is a diagram showing an illustrative tag cloud, according to one example of the principles described herein.

FIG. 3 illustrates an example of a tag cloud (300) that contains a "Europe" tag (301) and a "Mexico" tag (302). The "Europe" tag (301) may be associated with a highly popular keyword "Europe" within a tag source. However, the "Mexico" tag (302) may be a new tag created to reflect a new keyword recently added to the tag source. For purposes of illustration, the newer "Mexico" tag (302) is not shown with a score increase in the example of FIG. 3. A frequent user of the tag source may be familiar with the hyperlinks of the "Europe" tag (301), but the "Europe" tag (301) is significantly emphasized over the "Mexico" tag (302), which may be more interesting to the user. Thus, the user may overlook the "Mexico" tag (302), although it may be more interesting to the user.

Figure 4:
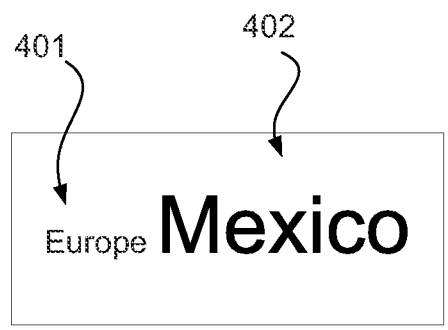
FIG. 4 is a flowchart showing an illustrative tag cloud, according to one example of the principles described herein.

FIG. 4 illustrates an example where the "Mexico" tag (402) receives a score increase to reflect its "new" status. Now, the "Mexico" tag (402) is emphasized more than the "Europe" tag (401), and the "Mexico" tag (402) catches the users' attention. In some examples, the "Europe" tag (401) is deemphasized to give the "Mexico" tag (402) a greater emphasis. However, in some examples, the "Europe" tag (401) and the "Mexico" tag (402) may be equally emphasized in the tag cloud, so that the "Europe" tag's prominence is unaltered by the "Mexico" tag's score increase. The system may allow the number of tags in the tag cloud to increase over time while still allowing new tags to be emphasized relative to the other tags in the cloud. Further, by highlighting or emphasizing tags that may be interesting to the user, the system personalizes the tag cloud to the user's needs. While FIGS. 3 and 4 are shown with just two tags each, the tag clouds may include many more tags.

The score increases for new tags may be significant enough to cause the new tag's resulting scores to be at least as high as a median score from all of the tags in the cloud. In some examples, the resulting scores may be as high as an average score of all the tags in the cloud. Further, some examples may include that the resulting scores give the new tags scores within the top quarter or third of all the scores. Other examples may result in the new tags' scores to fall within the top ten percent of all the scores. Some examples may result in the new tags' scores having the highest scores in the tag cloud.

In some examples, a new tag may receive the largest score increase within a first hour of its creation and then receive lower score increases as the hours from the tag's creation increase such that the new tag is progressively deemphasized as the new tag gets older. In some examples, the largest score increase is timed to occur at a specified time, such as three hours after the tag's creation. The new tag may still receive smaller score increases leading up to and away from a score peak.

In the example of FIG. 4, the "Mexico" tag (402) may be emphasized during a predetermined time period or a set duration for new tags to receive an increased score. However, after the predetermined time period expires, the "Mexico" tag (402) may lose the score increase and revert back to what the score would have been without the increase.

Figure 5:
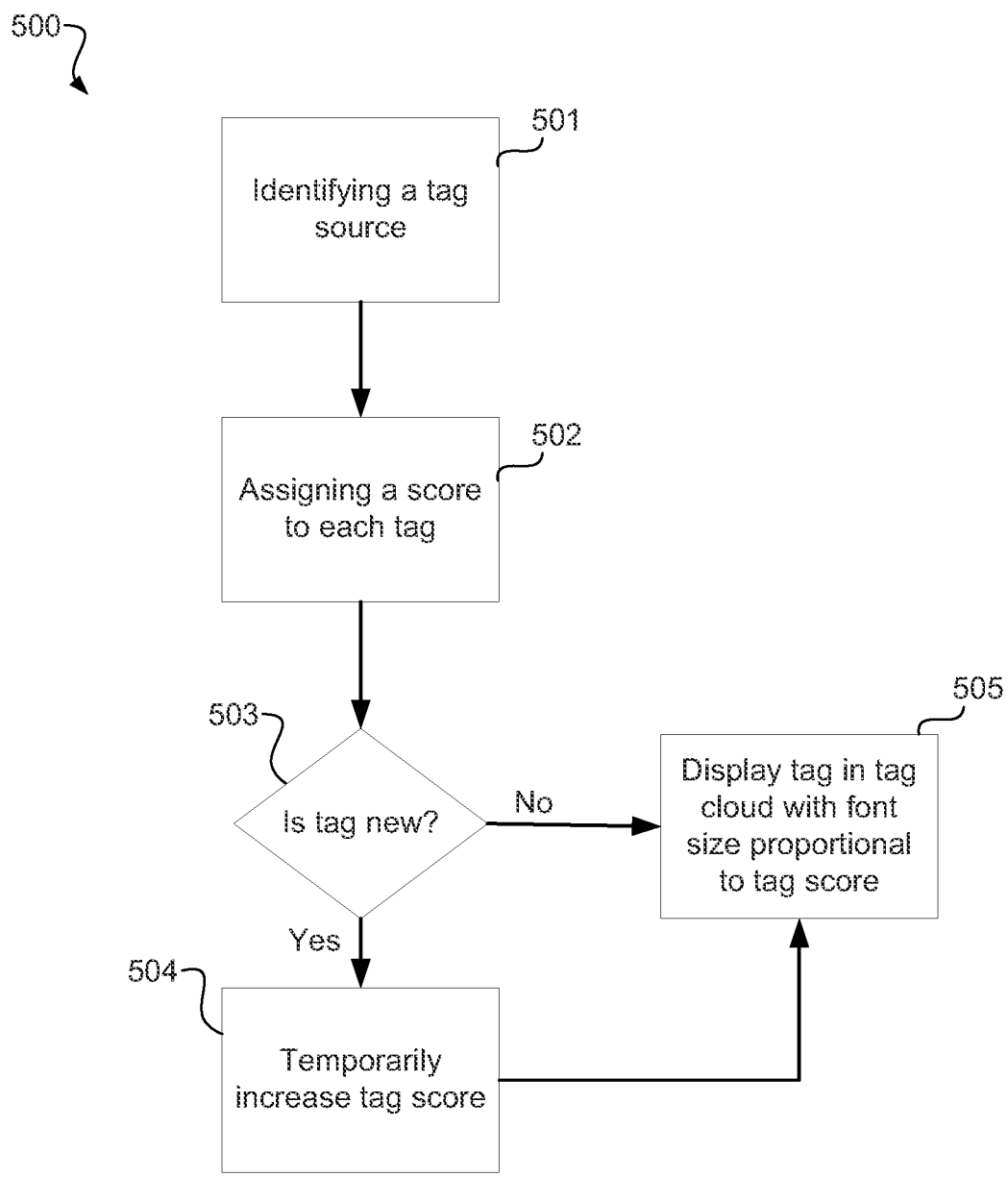
FIG. 5 is a diagram showing an illustrative flowchart for customizing a tag cloud, according to one example of the principles described herein.

FIG. 5 illustrates an example of a flowchart (500) for customizing a tag cloud. A tag cloud generator may identify (501) a tag source, which may be a website, online resource, audio file, document, image, or combinations thereof. Generally, the metadata in the source is analyzed and filtered to create tags for metadata associated with meaningful information for a user. However, in some examples, tags may be manually assigned to websites, images, or other sources.

The tag cloud generator may assign (502) a score to each tag. The generator may also determine (503) if the tag is new. If the tag is new, the tag cloud generator may increase (504) the tag's score. After the tag scores are finalized, the tag cloud is displayed (505) emphasizing each tag proportionally to each tag's score. In some examples, the tags are emphasized directly proportional to their score.

In alternative examples, the tag emphasis may be more loosely proportional to the scores. For example, one tag may be assigned a score of 5 and another score may be assigned a score of 4.9. However, the score of 5 may be the highest score in the tag cloud, and the cloud generator may significantly emphasize the highest scoring tag over all other tags even though the tag with the second highest score may have a substantially similar score.

In some examples, assigning a score to each tag may be based on a single tag attribute. Alternatively, the score may be assigned using multiple tag attributes. In some examples, multiple tags are used to generate a score, but some of the attributes are weighted differently.

Temporarily increasing the tag score may occur as an independent process or temporarily increasing the tag score may occur simultaneously with assigning the original score. However, an attribute of being new may be a temporary attribute and regardless of whether the score increase is factored into an original score or whether the increase occurs later, the score increase may still be temporary. Often, a tag cloud generator will refresh in real time or regenerate a tag cloud at the beginning of each website visit. Thus, the cloud generator may remove the score increase after a tag is no longer considered new.

A tag may be considered new when the tag attributes meet criteria set forth in a defined tag emphasis policy. In some examples, a tag may be considered new for a set duration, such as a predefined time period, after the tag's creation. The predefined time period may be a few hours, a day, couple of days, a week, or any other desired time period. Multiple predefined time periods may be used to determine the relative newness of a tag. In these examples, the newest tags may receive greater score increases than other new tags who fall within a later predefined time period. In some examples, the time period may be shortened or lengthened based on a user's activity.

Figure 6:
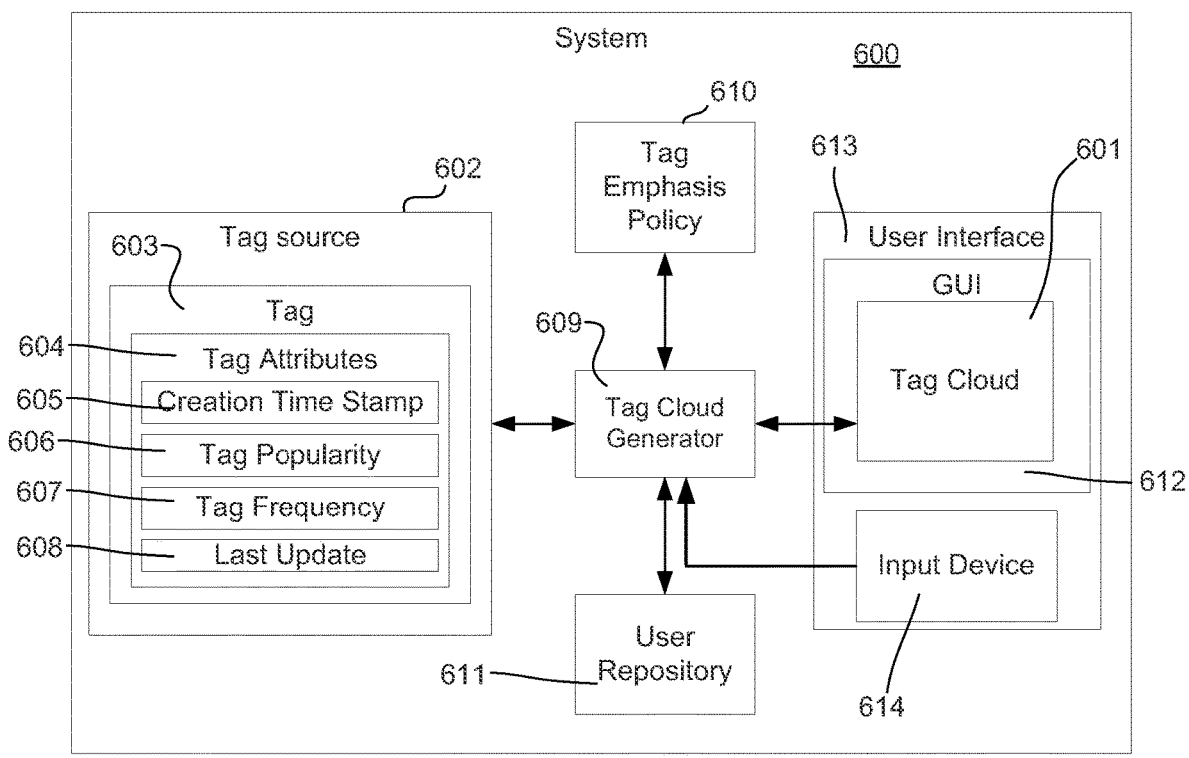
FIG. 6 is a diagram showing an illustrative system for customizing a tag cloud, according to one example of the principles described herein.

FIG. 6 is an illustrative system (600) for customizing a tag cloud (601). The system (600) may include a tag source (602), such as a website. Each tag (603) may comprise multiple attributes (604). A non-exhaustive list of illustrative attributes may include a time stamp (605) of the tag's creation, tag popularity (606), tag frequency (607), and a time stamp (608) of the most recent tag update.

A tag cloud generator (609) may sort through each tag (603) and its attributes (604). The tag cloud generator (609) may be in communication with a tag emphasis policy (610), which may include policies pertaining to how to assign scores to tags, the definition of a new tag, and how much of a score increase to give new tags.

The tag cloud generator (609) may also be in communication with a user repository (611) that contains information about a user's activity. The user repository (611) may include information indicating which tags the user clicked on and the last time the user viewed the tag cloud (601). Depending on the tag emphasis policy, the user repository (611) may help the tag cloud generator (609) determine if a tag (603) is still new to a particular user.

The tag cloud generator (609) may display the tag cloud (601) on a graphic user interface (612) of a user interface (613). The user interface (613) may comprise a user input device (614), such as a keyboard or microphone. A user may input information into the tag cloud generator (609), such as parameters for displaying the tag cloud (601), how to define a new tag, how long a new tag should receive an increased score, and so forth. If appropriate, the tag cloud generator (609) may communicate to the tag emphasis policy (610) the manually inputted parameters and thereby customize the tag emphasis policy (610) according to a user's desires.

In some examples, when a user connects to a source (602), like a webpage, the tag cloud generator (609) may check the tag emphasis policy (610). The policy (610) may direct the tag cloud generator (609) to check when the user last interacted with the tag cloud (601). The tag cloud generator (609) may give an increased score to every tag created since the user's last visit to the source, or give an increased score to every tag that has not been clicked by the user within a predetermined time period. In some examples, the policy (610) instructs the tag cloud generator (609) to give increased scores based on user interaction, predetermined time periods measured from a tag's creation, other factors that indicate a tag is new, or combinations thereof.

In some examples, the tag emphasis policy (610) may increase a score after a tag has been updated or changed. The time stamp (608) of the update may serve as the creation date for beginning the new tag time period. Tags may accumulate metadata over time, and some of the accumulated metadata may be interesting to frequent users. Thus, new metadata may create a new instance of a tag, which the policy (610) considers a new tag. In some examples, an update may include clicks by other users, association with new keywords, association with additional content in the tag source, or combinations thereof.

Figure 7:
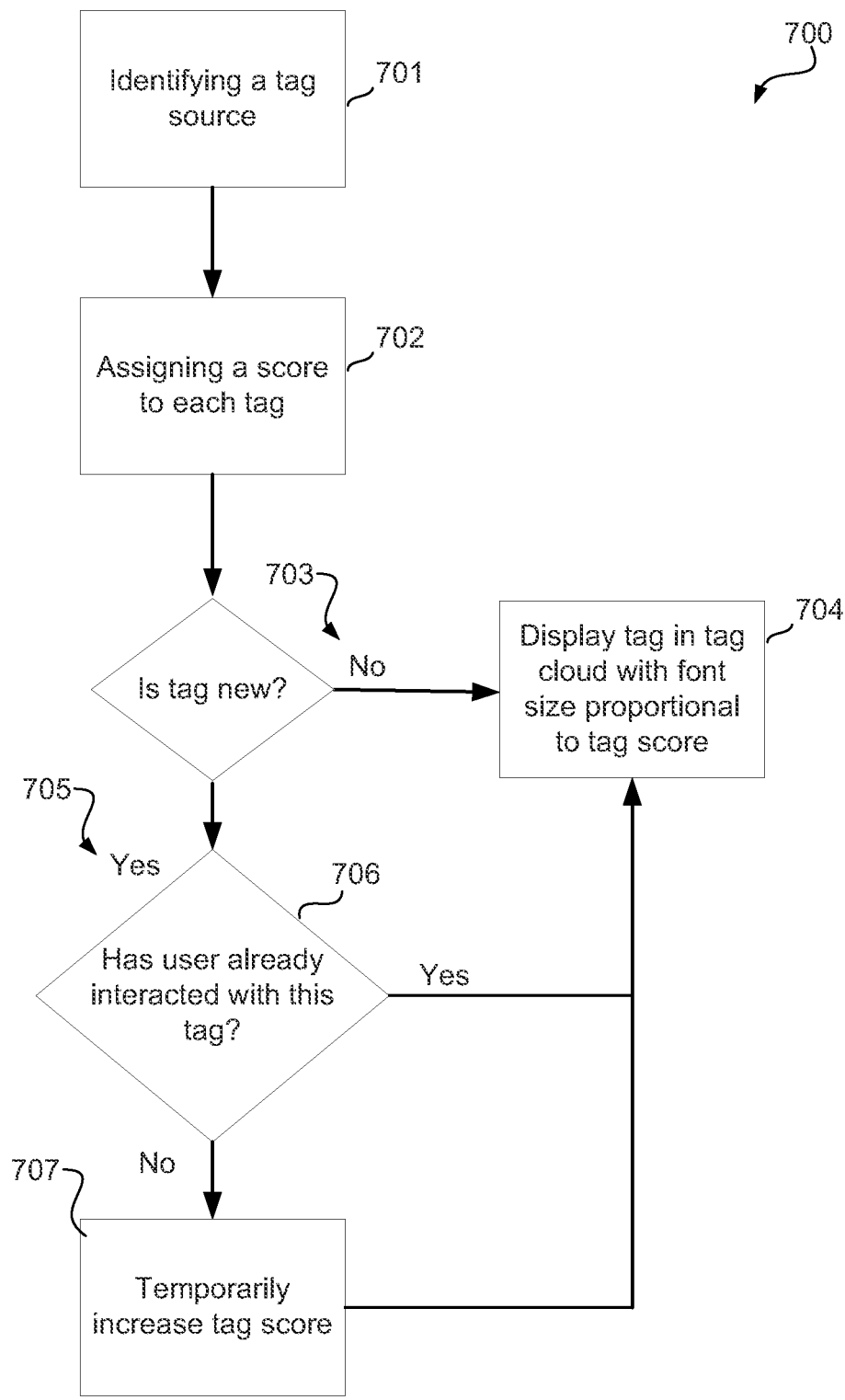
FIG. 7 is a diagram showing an illustrative flowchart for customizing a tag cloud, according to one example of the principles described herein.

FIG. 7 is an illustrative flowchart (700) of an example of customizing a tag cloud. A tag cloud generator may identify (701) tags within a tag source and assign (702) a score to each tag. If the tag cloud generator determines (703) that the tag is not new, then the tag is displayed (704) in the tag cloud. However, if the tag cloud determines (705) that the tag cloud is new, the tag cloud generator may further determine (706) if the user has already interacted with the tag. If the user has already interacted with the tag, then the tag cloud generator may opt to forgo a score increase and display (704) the tag with its originally assigned score. However, if the tag cloud generator determines that the user has not interacted with the new tag, the tag cloud generator may temporarily increase (707) the new tag's score.

User interaction may be defined by the user emphasis policy and may include clicking on the new tag, viewing the tag cloud when the new tag is present, or viewing webpages that are hyperlinked to the new tag. If the policy determines that the user has interacted sufficiently enough with the new tag, the tag cloud generator may revert the new tag's score to what the tag's score would have been without the temporary increase. In some examples, the temporary score increase is intended to notify the user of the new tag's presence; thus, if the tag cloud generator determines that the user is already aware of the new tag then the temporary score increase may be no longer useful.

In some examples, if the tag cloud generator determines that the user has interacted with the new tag, but the new tag still falls within a predefined time period, the tag cloud generator may give the new tag a smaller score increase.

While the illustrative flowchart of FIG. 7 has been described in relation to a user-based policy where user interaction influences the score increase of new tags, the policy may also be system based, server based, group based, or combinations thereof.

Further, the tag cloud generator may also group similar tags together. When a new tag is created, all of the tags in its group may receive a score increase equal to or less than the new tag's score increase. In some examples, the groups may comprise tags scattered through the tag cloud. In alternative examples, the tags within a group may be located together within the tag cloud. The tags within the groups may be ordered with the highest scoring tag located centrally within the group. In some examples, the groups may be organized in concentric circles with each concentric ring representing a group of similar tags.

The policy may also address scenarios when multiple new tags are created within a short period of time. In these scenarios, the policy may instruct the tag cloud generator to stagger the increased emphasis of the new tags, so they are not emphasized equally at the same time giving a user a better opportunity to notice each new tag. The policy may also prioritize the increased scores of new tags to reflect other metadata in the tag source that may influence the tag cloud generator to lower the increased score.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A computer implemented process for customizing a tag cloud, comprising:
    identifying a source of tags;
    assigning a score to each tag in said source based on characteristics of said tags;
    identifying a new tag within said source, wherein the new tag is considered to be a new tag based on a tag emphasis policy;
    grouping the new tag with a number of other tags within the source of tags;
    increasing said score for said new tag based on the tag emphasis policy wherein the tag emphasis policy comprises a first block of time after new tag creation with a first fixed non-zero increase and a second block of time with a non-zero increase less than a value of the first fixed non-zero increase such that an increase applied said score for said new tag decreases incrementally over time a time each tag was created;

customizing a display of said tag cloud in a graphical user interface by emphasizing each tag according to its score, the emphasis of each tag being increased with an increase of each tag's respective score; and increasing a score of a first one of the plurality of tags based on an update to the first one of the plurality of tags, wherein the update of the first one of the plurality of tags comprises association of the first one of the plurality of tags with a new keyword, association of the first one of the plurality of tags with additional content, or a combination thereof, wherein increased emphasis of new tags are staggered in time so they are not emphasized equally at the same time.

2. The computer implemented process of claim 1, wherein increasing said score for said new tag comprises temporarily increasing said score for a fixed time period.

3. The computer implemented process of claim 1, wherein increasing said score for said new tag comprises increasing said score until a user interacts with said new tag.

4. The computer implemented process of claim 1, wherein a plurality of groups of tags are displayed in concentric circles, the concentric circles identifying which tags belong to which groups.

5. The computer implemented process of claim 1, further comprising adjusting a number of user-adjustable settings defining whether new tags are or are not emphasized based on user input.

6. The computer implemented process of claim 1, wherein the score increase for the new tag is at least as high as a median score from all of the tags in the tag cloud.

7. The computer implemented process of claim 1, wherein the tag emphasis policy comprises a policy that defines the new tag as new based on a user's activity comprising a most recent time the user viewed the tag cloud.

8. The computer implemented process of claim 1, comprising increasing the score for the new tag in response to a determination that the new tag has not been selected by the user within a predetermined time period.

9. A method for customizing a tag cloud, comprising:

increasing a score of each tag in a plurality of tags based on a tag emphasis policy, wherein the tag emphasis policy comprises adding an increase to a score of a first tag designated as a new tag by an amount inversely related to a time since a creation of the first tag such that the increase in score decreases over time from the creation of the first tag, the increase to the score of each tag being based on both the time since creation of each tag respectively and a determination of whether a user has clicked on each tag respectively;

leaving scores of tags with a creation time that falls outside of a time period unaltered; and emphasizing each tag in a user interface according to its score, wherein increased emphasis of new tags is staggered in time so the new tags are not emphasized equally at the same time.

10. The method of claim 9, further comprising:

increasing said score for the new tag during a time period measured from the creation of said new tag; and adjusting said score when said time period of said new tag expires so that said score reverts to what said score would have been without increasing said score.

11. The method of claim 9, further comprising adjusting a number of user-adjustable settings defining whether new tags are or are not emphasized based on user input.

12. The method of claim 9, wherein the score increase for the new tag is at least as high as a median score from all of the tags in the tag cloud.

13. The method of claim 9, wherein the tag emphasis policy comprises a policy that defines the new tag as new based on a user's activity comprising a most recent time the user viewed the tag cloud.

14. The method of claim 9, wherein:

the new tag is grouped with a number of other tags, and the other tags receive a score increase equal to the new tag's increase within the tag cloud.

15. The method of claim 9, further comprising increasing a score of the new tag in response to an update of the new tag, wherein the update of the new tag comprises association of the new tag with a new keyword, association of the new tag with additional content, or a combination thereof.

* * * * *